(12) United States Patent  (10) Patent No.: US 8,149,856 B2
Kogata et al.  (45) Date of Patent: Apr. 3, 2012

(54) PACKET RELAY DEVICE AND QUEUE SCHEDULING METHOD

(75) Inventors: Hiroyuki Kogata, Osaka (JP); Hisaya Ogasawara, Osaka (JP); Akio Shinohara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 267 days.

(21) Appl. No.: 12/566,277

(22) Filed: Sep. 24, 2009

(65) Prior Publication Data

US 2010/0014539 A1   Jan. 21, 2010

Related U.S. Application Data

(63) Continuation of application No. PCT/JP2007/056365, filed on Mar. 27, 2007.

(51) Int. Cl.
*H04L 12/56* (2006.01)
(52) U.S. Cl. .............. 370/412; 370/395.4; 370/413; 370/416
(58) Field of Classification Search ............ 370/395.4, 370/412, 413, 416
See application file for complete search history.

(56) References Cited

U.S. PATENT DOCUMENTS

| | | | | |
|---|---|---|---|---|
| 7,436,845 | B1* | 10/2008 | Rygh et al. | 370/413 |
| 2002/0181469 | A1* | 12/2002 | Furusawa | 370/395.4 |
| 2002/0181484 | A1* | 12/2002 | Aimoto | 370/413 |
| 2005/0036475 | A1 | 2/2005 | Nishiyama et al. | |
| 2007/0260777 | A1* | 11/2007 | Timpe et al. | 710/52 |
| 2009/0013104 | A1* | 1/2009 | Nishimoto et al. | 710/36 |

FOREIGN PATENT DOCUMENTS

| | | |
|---|---|---|
| JP | 11252097 | 9/1999 |
| JP | 2000124906 | 4/2000 |
| JP | 2003152791 | 5/2003 |
| JP | 200520163 | 1/2005 |
| JP | 2005038208 | 2/2005 |

OTHER PUBLICATIONS

International Search Report dated May 15, 2007.

* cited by examiner

*Primary Examiner* — Dang Ton
*Assistant Examiner* — Mohamed Kamara
(74) *Attorney, Agent, or Firm* — Murphy & King, P.C.

(57) ABSTRACT

Each of the plurality of queues stores packet data of a received packet. The read concession assignor assigns one of the plurality of queues with a read concession for a predefined time period. The overdraft storage stores an overdraft amount in connection with each of the plurality of queues. The read adequacy determiner determines, in accordance with an overdraft amount stored in connection with one queue out of the plurality of queues, whether to read packet data from the one queue. The overdraft updater updates at least one of a first overdraft amount stored in connection with a first queue and a second overdraft amount stored in connection with a second queue different from the first queue upon reading packet data from the first queue during a time period while the second queue is assigned with the read concession.

20 Claims, 9 Drawing Sheets

PACKET RELAY DEVICE AND QUEUE SCHEDULING METHOD

CROSS-REFERENCE TO RELATED APPLICATION

This is a continuation of Application PCT/JP2007/056365, filed on Mar. 27, 2007, the entire contents of which are incorporated herein by reference.

FIELD

The embodiments discussed herein are related to a packet relay device and, more particularly, to a queue scheduling method employed in the packet relay device.

BACKGROUND

A packet relay device includes a plurality of communication ports therein. A packet is received via one of the plurality of communication ports, and stored in a queue. The stored packet is read from the queue in a first-in first-out manner. One or more communication ports via which the packet is to be transmitted are determined and the packet is transferred to the determined output ports. When the packet relay device includes a plurality of queues, a queue scheduling for handling these plurality of queues becomes a problem. The deficit round robin (DRR) scheme has been proposed as a queue scheduling method which allows a plurality of queues to be fairly handled, and this DRR scheme is also employed in packet relay devices (for example, see Japanese Laid-open Patent Publication No. 11-252097).

In the DRR scheme, a quantum value, which is a quota of an amount of data read from each queue in one read process, is determined in advance. That is, data of an amount of the quantum value has been read from one queue, the read process on the queue terminates to shift to the read process on another queue. When an amount of data stored in a queue is less than the quantum value, the read process on the queue terminates upon completion of reading entire data stored in the queue. A read process on each queue is performed on a packet-by-packet basis, and thus, practically, the read process may not terminate upon completion of reading an amount of data exactly corresponding to the quantum value. Instead, the read process on the queue may be prolonged until completion of reading a packet which has being read at a time when the amount of data corresponding to the quantum value has been read. An amount of data read beyond the quantum value is referred to as a deficit value. A quota of an amount of data for the next read process on the queue is calculated by subtracting the deficit value from the quantum value. By repeating this operation, an average amount of data obtained by one read process on each queue becomes close to the quantum value. Thus, the DRR scheme is considered as a fair queue scheduling method.

SUMMARY

According to an aspect of the present invention, provided is a packet relay device for relaying a packet. The packet relay device includes a plurality of queues, a read concession assignor, an overdraft storage, a read adequacy determiner, and an overdraft updater.

Each of the plurality of queues stores packet data of a received packet.

The read concession assignor assigns one of the plurality of queues with a read concession for a predefined time period.

The read concession allows the packet relay device to read packet data stored in a queue assigned with the read concession.

The overdraft storage stores an overdraft amount in connection with each of the plurality of queues. The overdraft amount indicates an amount of packet data read from a queue during a time period while another queue is assigned with the read concession.

The read adequacy determiner determines, in accordance with an overdraft amount stored in connection with one queue out of the plurality of queues, whether to read packet data from the one queue.

The overdraft updater updates at least one of a first overdraft amount stored in connection with a first queue and a second overdraft amount stored in connection with a second queue different from the first queue upon reading packet data from the first queue during a time period while the second queue is assigned with the read concession.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the DRR scheme, a weight may be allocated to each queue, and a quantum value in proportion to the weight may be applied to each queue. In this case, the size of each queue may be in consistent with the weight allocated thereto against the size of a queue to which a minimum weight is allocated. Therefore, when a maximum weight allowed to be allocated is large, in proportion thereto, the sizes of individual queues to be provided are increased, thereby causing resources inside the packet relay device to be consumed to a great degree.

Accordingly, for a queue scheduling in a packet relay device, it is preferable to provide a queue scheduling method which makes it unnecessary to particularly increase the sizes of queues, even when weights allocated to the queues are large.

According to the embodiments, the weights allocated to the queues are reflected to time allocation on a queue scheduling in a packet relay device. Thus, it is possible to provide a queue scheduling method which makes it unnecessary to particularly increase the sizes of queues, even when the weights allocated to the queues are large.

Hereinafter, an embodiment of the present invention will be discussed with reference to drawings.

Figure 1:
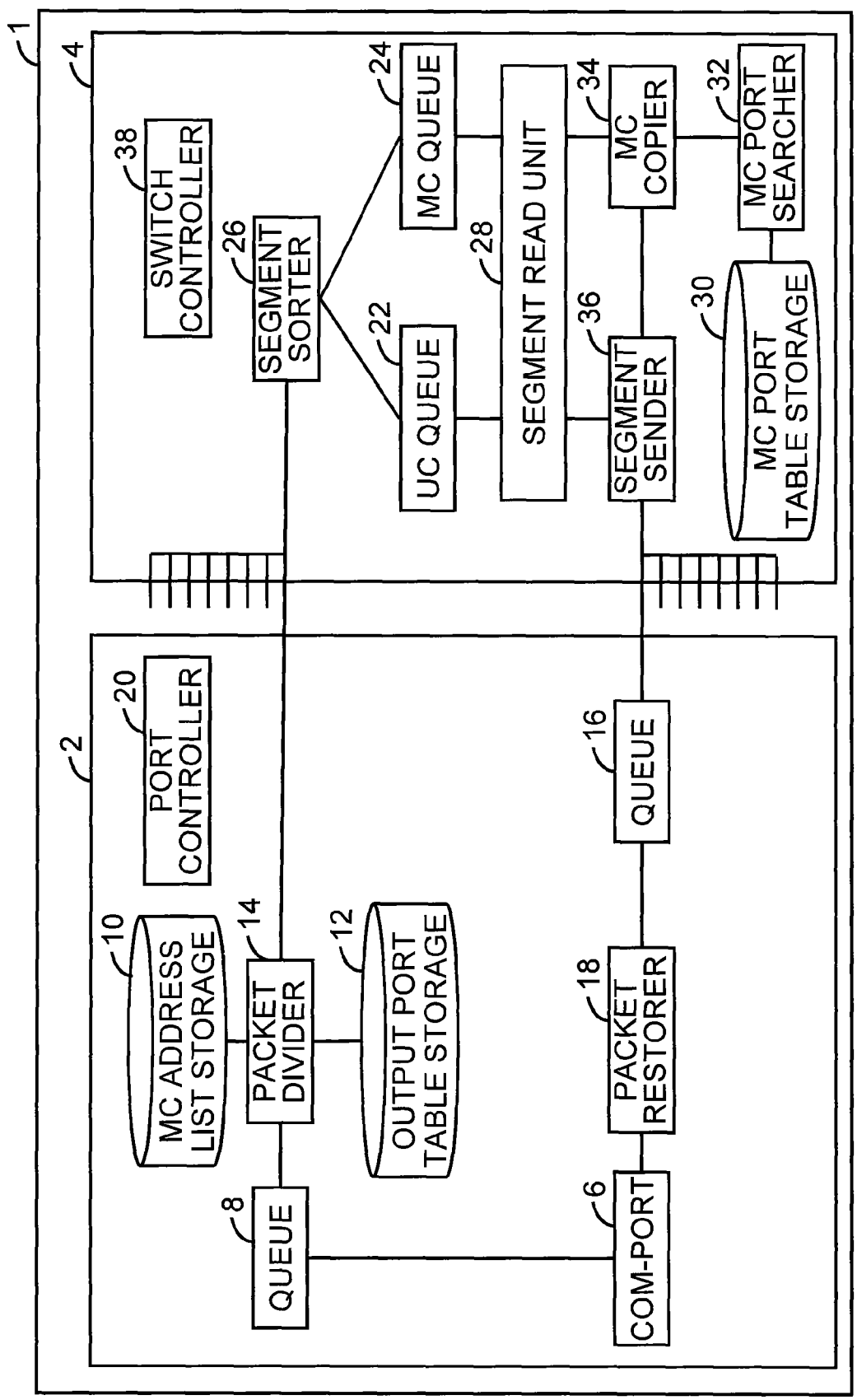
FIG. 1 is a diagram illustrating an example of a system configuration of a packet relay device according to an embodiment of the present invention.

FIG. 1 is a diagram illustrating an example of a system configuration of a packet relay device according to an embodiment of the present invention. A packet relay device 1 illustrated in the example of FIG. 1 includes a plurality of line cards 2 and a switch card 4. One of the line cards 2 receives a packet and transfers the packet to the switch card 4. The switch card 4 transfers the packet to one of the line cards 2. The line card 2 received the packet from the switch card 4 transmits the packet.

Each of the line cards 2 includes a communication port (denoted by "COM-PORT" in the drawings) 6, a queue 8, an MC address list storage 10, an output port table storage 12, a packet divider 14, a queue 16, a packet restorer 18, and a port controller 20.

The communication port 6 receives and transmits a packet.

The queue 8 temporarily stores an input packet.

The MC address list storage 10 stores an MC address list containing a destination address of a multicast packet.

The output port table storage 12 stores an output port table containing an output port identifier (ID) capable of identifying an output port for a unicast packet.

The packet divider 14 divides a packet into segments.

The queue 16 temporarily stores a segment transferred from the switch card 4.

The packet restorer 18 combines segments to restore the packet.

The port controller 20 controls the entire line card 2.

In the discussion of the embodiment, it is assumed that each communication port 6 is included in a different line card 2. However, it is not necessary for each communication port 6 to be included in a different line card 2. In the discussion of the embodiment, the MC address list storage 10 and the output port table storage 12 are provided for each communication port 6, respectively. However, they may be provided for a plurality of communication ports 6, respectively. Further, the entire packet relay device 1 may include only one MC address list storage 10 and only one output port table storage 12, respectively.

The communication port 6 receives an input packet and transfers the input packet to the queue 8. Further, the communication port 6 transmits an output packet transferred from the packet restorer 18.

The queue 8 stores the input packet transferred from the communication port 6, and transfers the stored packet to the packet divider 14 in a first-in first-out manner.

The MC address list storage 10 stores an MC address list containing a destination address of a multicast packet.

The output port table storage 12 stores the output port table containing an output port ID corresponding to a destination address of a unicast packet. The content of the output port table is stored as a result of a source address learning process. The source address learning process is irrelevant to the intent of the present embodiment and is a technology well-known to those skilled in the art, thus, is omitted from this discussion.

The packet divider 14 divides the input packet transferred from the queue 8 into blocks of data having a predefined size, adds a segment header to each block of data to form a segment, and transfers the segments to the switch card 4. The packet divider 14 performs this process with reference to the MC address list stored in the MC address list storage 10 and/or the output port table stored in the output port table storage 12.

The queue 16 temporarily stores segments transferred from the switch card 4, and then, transfers the stored segments to the packet restorer 18.

The packet restorer 18 removes the segment header from each of the segments transferred from the queue 16 and combines resultant blocks of data to restore a packet.

The port controller 20 controls the entire line card 2. It is assumed that all of the functions, which is not performed by the above-discussed each processing unit, among the functions performed by the line card 2 may be processed by the port controller 20.

The switch card 4 includes a UC queue 22, an MC queue 24, a segment sorter 26, a segment read unit 28, an MC port table storage 30, an MC port searcher 32, an MC copier 34, a segment sender 36, and a switch controller 38.

The UC queue 22 temporarily stores segments, which have been derived from a unicast packet, transferred from a line card 2.

The MC queue 24 temporarily stores segments, which have been derived from a multicast packet, transferred from a line card 2.

The segment sorter 26 sorts segments into the UC queue 22 or the MC queue 24.

The segment read unit 28 reads segments from the UC queue 22 or the MC queue 24.

The MC port table storage 30 stores an MC port table containing data on an output port associated with a multicast packet.

The MC port searcher 32 searches for an output port associated with a multicast packet.

The MC copier 34 copies the segments derived from a multicast packet and rewrites a segment header of each copied segment for a respective output port.

The segment sender 36 transfers segments to a line card 2.

The switch controller 38 controls the entire switch card 4.

The segment sorter 26 sorts segments transferred from a line card 2 to the UC queue 22 or the MC queue 24.

The UC queue 22 temporarily stores segments, which have been derived from a unicast packet, transferred from the segment sorter 26, and transfers the stored segments to the segment read unit 28 in a first-in first-out manner.

The MC queue 24 temporarily stores segments, which have been derived from a multicast packet, transferred from the segment sorter 26, and, transfers the stored segments to the segment read unit 28 in a first-in first-out manner.

The segment read unit 28 reads segments from the UC queue 22 to transfer the read segments to the segment sender 36, and reads segments from the MC queue 24 to transfer the read segments to the MC copier 34.

The MC port table storage 30 stores an MC port table containing data on an output port corresponding to a destination address of a multicast packet.

The MC port searcher 32 searches the MC port table storage 30 for an output port ID in accordance with a destination address contained in each segment, and then, outputs the found output port ID to the MC copier 34.

The MC copier 34 copies, when the transferred segment is a segment derived from a multicast packet, the transferred segment for the output port identified with the output port ID found by the MC port searcher 32, writes the output port ID into the segment header of the copied segment, and transfers the resultant segment to the segment sender 36.

The segment sender 36 sends the transferred segment to the corresponding line card 2 in accordance with the output port ID contained in the segment header of the transferred segment.

The switch controller 38 controls the entire switch card 4. It is assumed that all of the functions, which is not performed by the above-discussed each processing unit, among the performed by the switch card 4 may be processed by the switch controller 38.

Hereinafter, operations performed by the packet relay device 1 will be discussed.

Figure 2:
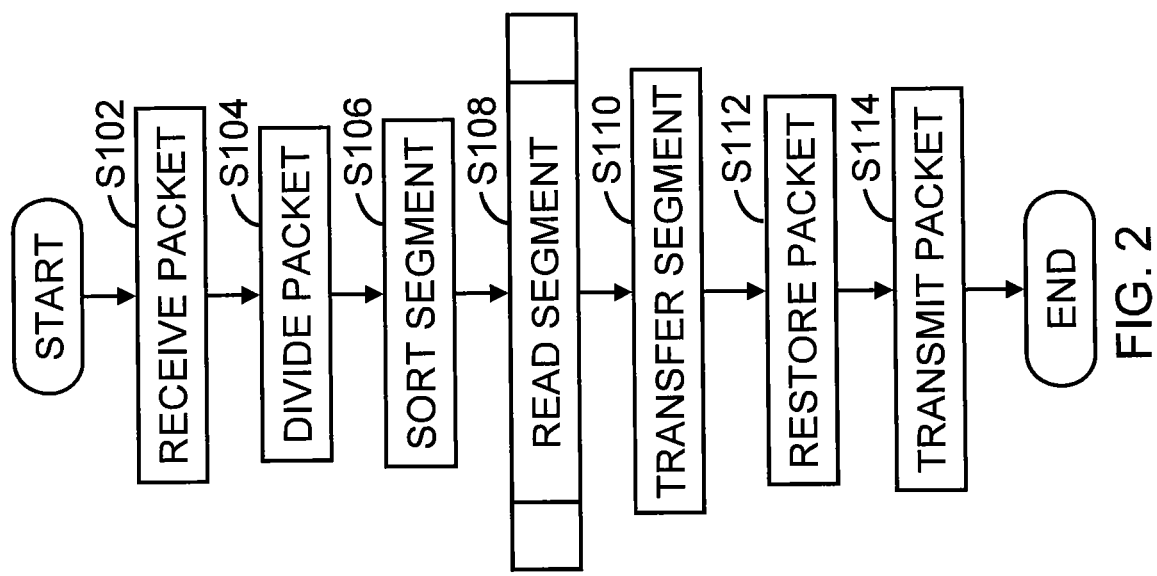
FIG. 2 is a flowchart illustrating an example of an operation flow of a process performed by the packet relay device according to an embodiment of the present invention.

FIG. 2 is a flowchart illustrating an example of an operation flow of a process performed by the packet relay device according to an embodiment of the present invention. Hereinafter, an operation flow of a process performed by the packet relay device 1 according to the embodiment of the present invention will be discussed in the order of operation S102 to operation S114 illustrated in FIG. 2.

In operation S102, the communication port 6 receives an input packet and stores the input packet in the queue 8.

In operation S104, the packet divider 14 divides the input packet stored in the queue 8 into blocks of data having a predefined size, adds a segment header to each block of data to form a segment. When a destination address contained in the input packet corresponds to one of addresses stored in the MC address list storage 10, the packet divider 14 sets an MC flag, which is capable of indicating that this segment is derived from a multicast packet, contained in a segment header of each segment. When the destination address contained in the input packet corresponds to none of addresses stored in the MC address list storage 10, the packet divider 14 searches the output port table storage 12 for an output port ID in accordance with the destination address contained in the input packet, and writes the found output port ID into a segment header of each segment. When the packet divider 14 fails to find an output port ID in the output port table storage 12, the packet divider 14 sets a BC flag, which is capable of indicating that this segment is derived from a broadcast packet, contained in the segment header of each segment. The packet divider 14 transfers the segments to the switch card 4.

In operation S106, when the MC flag or the BC flag is set in the segment header of the transferred segment, that is, when the transferred segment is derived from a multicast packet or a broadcast packet, the segment sorter 26 stores the segment in the MC queue 24. When neither the MC flag nor the BC flag is set in the segment header of the transferred segment, that is, when the transferred segment is derived from a unicast packet, the segment sorter 26 stores the segment in the UC queue 22.

In operation S108, the segment read unit 28 reads the segment from the UC queue 22 or the MC queue 24. The details of a segment read process will be discussed later.

In operation S110, the segment sender 36 transfers the segment to the corresponding line card 2 in accordance with the output port ID contained in the segment header of the segment.

In operation S112, the packet restorer 18 removes the segment header from the transferred segment, and combines segments without the segment header to restore a packet.

In operation S114, the communication port 6 transmits the restored packet.

In the embodiment, it is assumed that the packet relay device 1 controls the segment read process for reading segments from the queues in accordance with a read concession.

Figure 3:
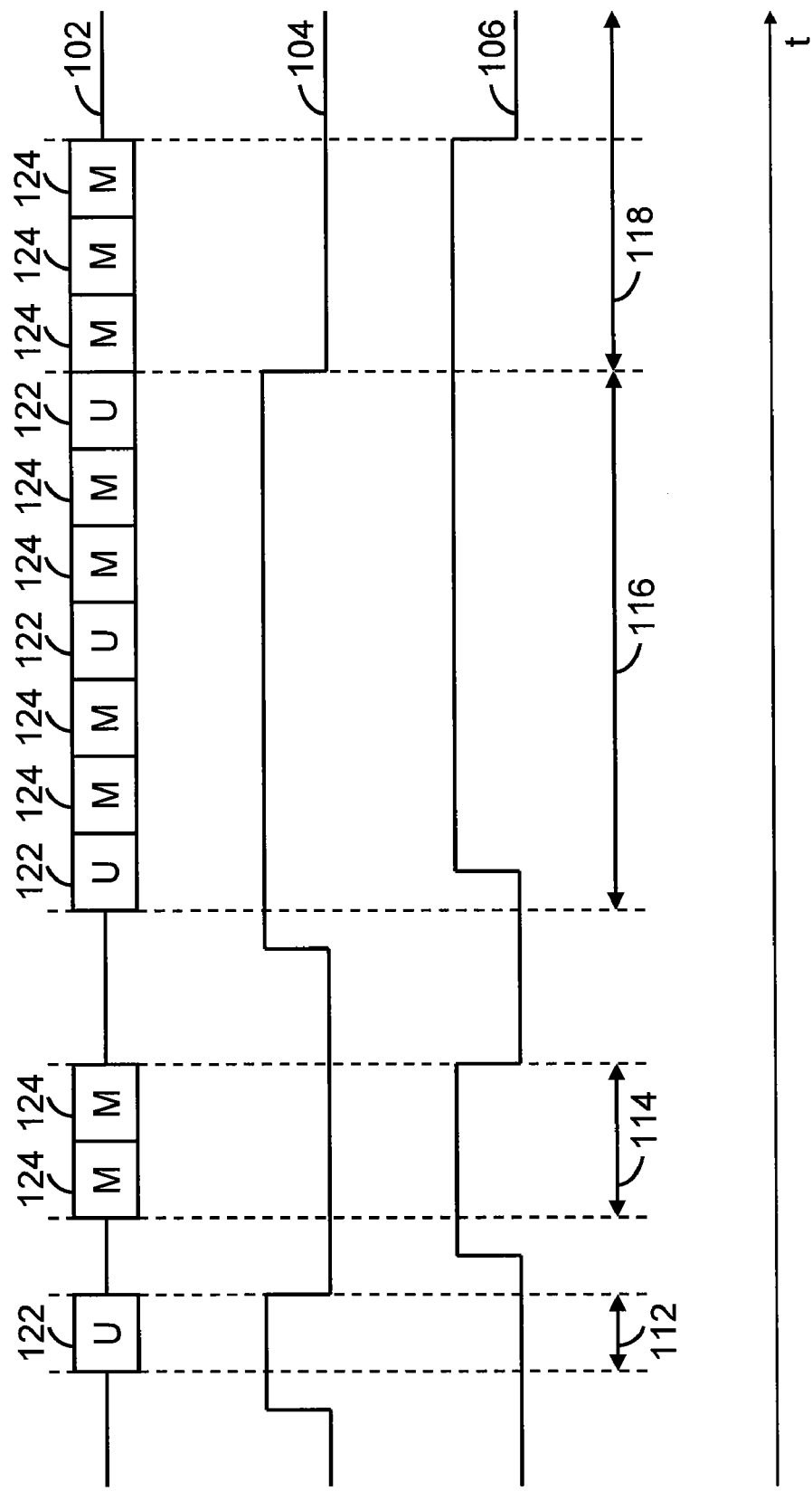
FIG. 3 is a diagram illustrating an example of a read concession according to an embodiment of the present invention.

FIG. 3 is a diagram illustrating an example of a read concession according to an embodiment of the present invention. FIG. 3 illustrates a UCF graph 104, an MCF graph 106, and a read concession indication 102. A horizontal axis is a time axis.

The UCF graph 104 represents a time variation of a flag value which indicates a condition as to whether the UC queue 22 is empty or not.

The MCF graph 106 represents a time variation of a flag value which indicates a condition as to whether the MC queue 24 is empty or not.

The read concession indication 102 indicates which of the UC queue 22 and the MC queue has the read concession.

The UCF graph 104 takes a value "0" when the UC queue 22 is empty and a value "1" when the UC queue 22 is not empty. The MCF graph 106 takes a value "0" when the MC queue 24 is empty, and a value "1" when the MC queue 24 is not empty. With respect to the read concession indication 102, for a time period while the UC queue has the read concession, a box 122 appended with a letter "U" is illustrated, and for a time period while the MC queue has the read concession, a box 124 appended with a letter "M" is illustrated. During a time period while neither of the boxes are illustrated, neither of the queues has the read concession. The length of each box in the time-axis direction represents a predefined time period for reading a segment, that is, one segment is read during a time period represented by one box.

During a time period 112, only the UC queue 22 is not empty, and thus, the read concession is assigned to the UC queue 22. During time periods 114 and 118, only the MC queue is not empty, and thus, the read concession is assigned to the MC queue 24. During a time period 116, neither the UC queue 22 nor the MC queue 24 is empty, and thus, the read concession is allocated in time in accordance with the weight predefined for each queue. In an example illustrated in FIG. 3, it is assumed that the weights are allocated in accordance with the following expression, UC:MC=1:2. Therefore, during the time period 116, the read concession is allocated in accordance with a proportion of two boxes each appended with a letter "M" in contrast to one box appended with a letter "U". In the embodiment, the segment read unit 28 manages this read concession.

Figure 4:
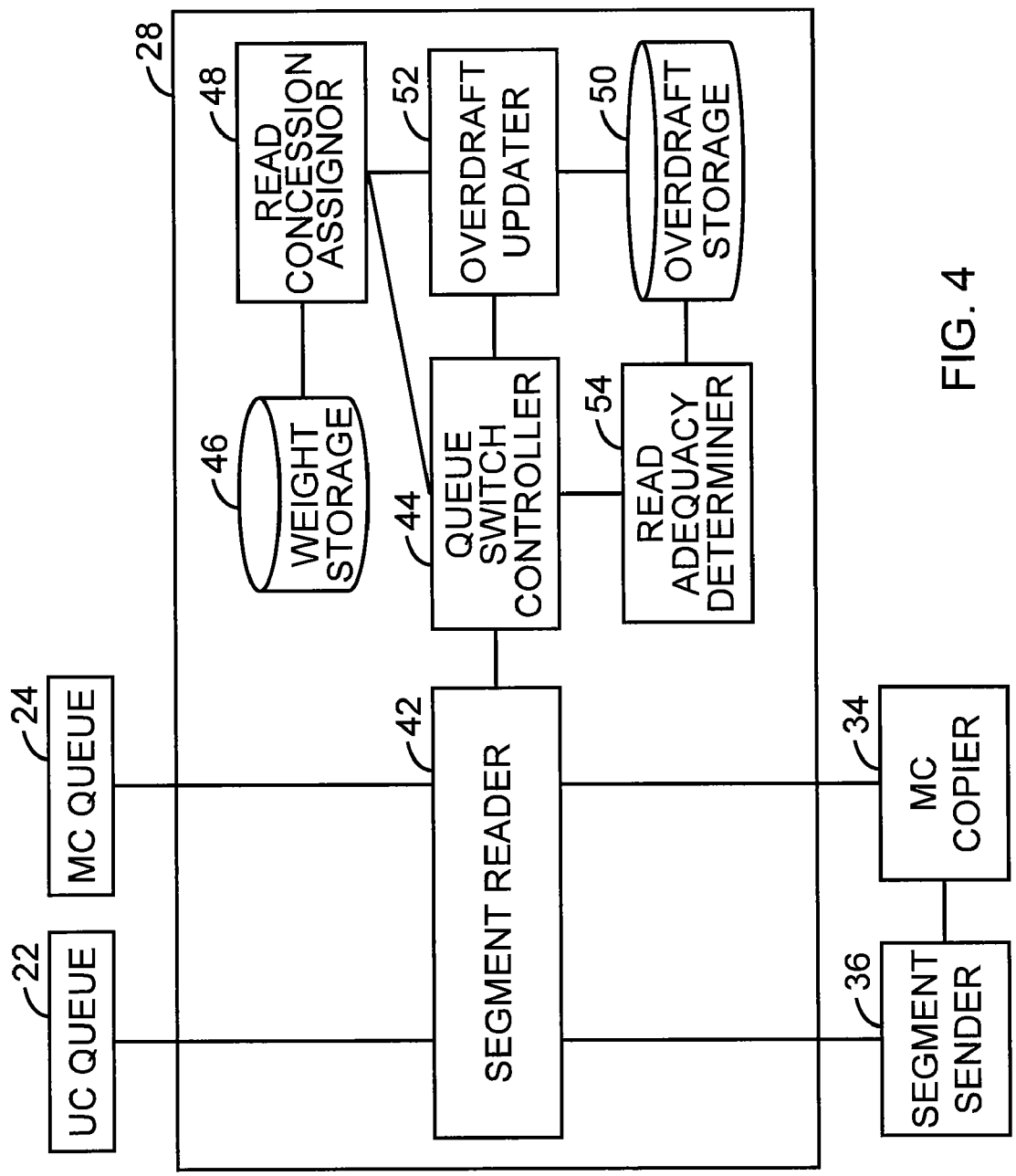
FIG. 4 is a diagram illustrating an example of a configuration of a segment read unit in a packet relay device according to an embodiment of the present invention.

FIG. 4 is a diagram illustrating an example of a configuration of a segment read unit in a packet relay device according to an embodiment of the present invention. The segment read unit 28 includes a segment reader 42, a queue switch controller 44, a weight storage 46, a read concession assignor 48, an overdraft storage 50, an overdraft updater 52, and a read adequacy determiner 54.

The segment reader 42 reads a segment from either of the UC queue 22 and the MC queue 24.

The queue switch controller 44 controls from which of the UC queue 22 and the MC queue 24 the segment reader 42 reads the segment.

The weight storage 46 stores each weight assigned to the UC queue 22 and the MC queue 24, respectively.

The read concession assignor 48 assigns the UC queue 22 or the MC queue 24 with the read concession for each predefined time period.

The overdraft storage 50 stores two overdraft amounts corresponding to the UC queue and the MC queue, respectively. Each of the overdraft amounts represents an amount of segments which were read from the corresponding queue during time periods while the read concession was not assigned to the corresponding queue.

The overdraft updater 52 updates the overdraft amounts.

The read adequacy determiner 54 determines, with respect to the UC queue 22 or the MC queue 24, whether to perform the segment read process.

The segment reader 42 reads a segment from the UC queue 22 or the MC queue 24 in accordance with the control by the queue switch controller 44, and then, transfers the read segment to the segment sender 36 or the MC copier 34.

The queue switch controller 44 controls from which of the UC queue 22 and the MC queue 24 the segment reader 42 reads the segments in accordance with a determination result notified from the read adequacy determiner 54. The queue switch controller 44 also notifies the overdraft updater 52 of data on a queue from which the segment reader 42 has read the segments, and the number of read segments.

The weight storage 46 stores each weight assigned to the UC queue 22 and the MC queue 24, respectively, in advance.

The read concession assignor 48 assigns the UC queue 22 or the MC queue 24 with the read concession for each predefined time period in accordance with weights assigned to the UC queue 22 and the MC queue 24, respectively.

In the overdraft storage 50 stores a UC overdraft amount corresponding to the UC queue 22 and an MC overdraft amount corresponding to the MC queue 24.

The overdraft updater 52 updates values of overdraft amounts stored in the overdraft storage 50 in accordance with data on a queue from which the segment reader 42 has read the segments and the number of read segments, which are notified from the queue switch controller 44, and data on the read concession assigned by the read concession assignor 48.

The read adequacy determiner 54 determines, with respect to the UC queue 22 or the MC queue 24, whether to read segments, in accordance with values of overdraft amounts stored in the overdraft storage 50, and notifies the queue switch controller 44 of the determination result.

Figure 5:
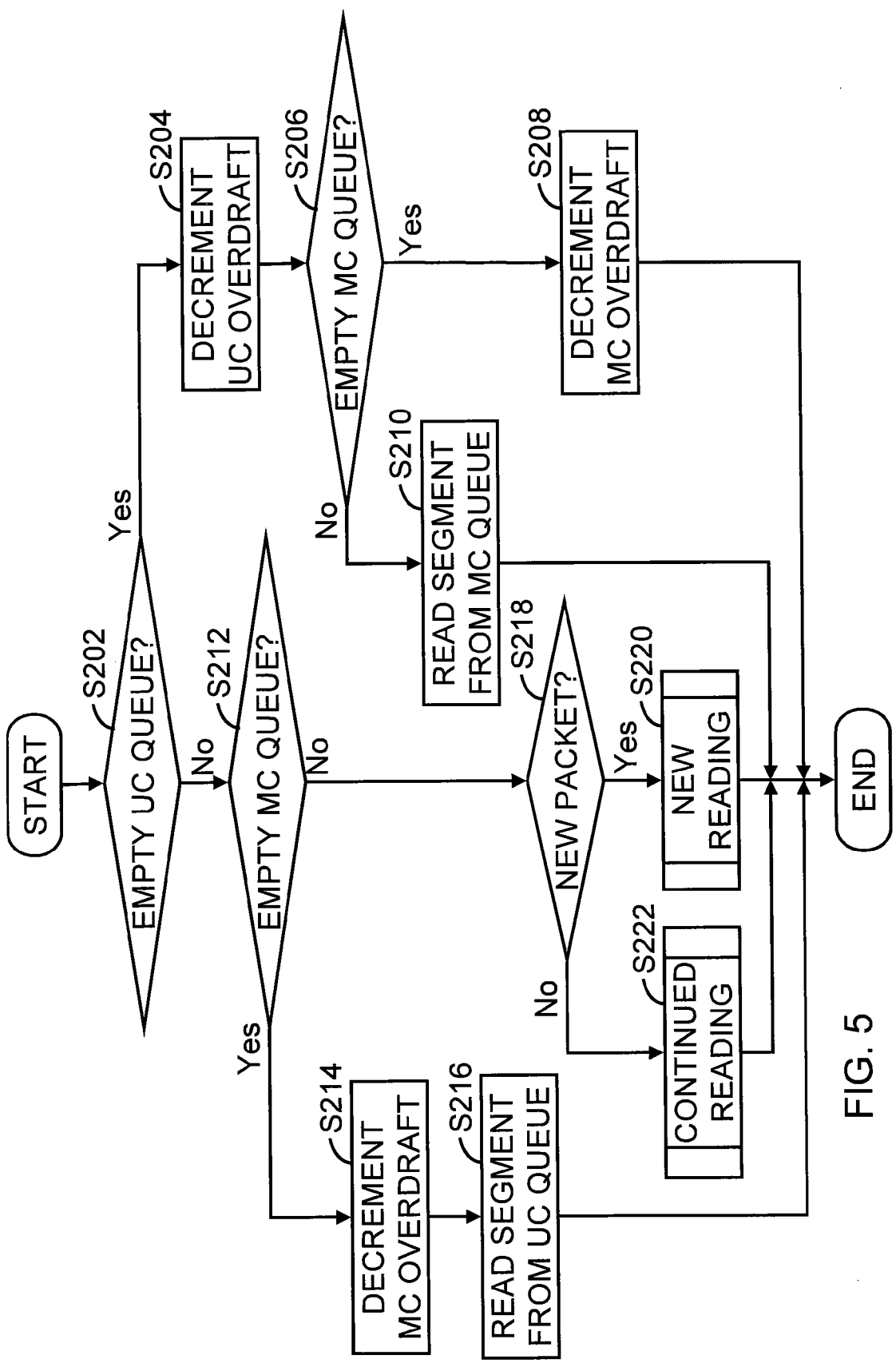
FIG. 5 is a flowchart illustrating an example of an operation flow of a segment read process according to an embodiment of the present invention.

FIG. 5 is a flowchart illustrating an example of an operation flow of a segment read process according to an embodiment of the present invention. Hereinafter, an operation flow of a segment read process according to the embodiment of the present invention will be discussed in the order of operation S202 to operation S222 illustrated in FIG. 5. It is assumed that the segment read process is performed every predefined time period for reading a segment.

In operation S202, the queue switch controller 44 determines whether the UC queue 22 is empty.

In operation S204, when the UC queue 22 is empty ("Yes" in operation S202), the overdraft updater 52 subtracts one from the value of the UC overdraft amount. In the embodiment, it is assumed that the value of the UC overdraft amount is not updated when the value of the UC overdraft amount is not a positive value. Further, it is assumed that the amount of packet data read from the queues is counted by the number of the read segments.

In operation S206, the queue switch controller 44 determines whether the MC queue 24 is empty.

In operation S208, when the MC queue 24 is empty ("Yes" in operation S206), the overdraft updater 52 subtracts one from the value of the MC overdraft amount. In the embodiment, it is assumed that the value of the MC overdraft amount is not updated when the value of the MC overdraft amount is not a positive value.

In operation S210, when the MC queue 24 is not empty ("No" in operation S206), the segment reader 42 reads a segment from the MC queue 24.

In operation S212, when the UC queue is not empty ("No" in operation S202), the queue switch controller 44 determines whether the MC queue 24 is empty.

In operation S214, when the MC queue 24 is empty ("Yes" in operation S212), the overdraft updater 52 subtracts one from the value of the MC overdraft amount. In the embodiment, it is assumed that the value of the MC overdraft amount is not updated when the value of the MC overdraft amount is not a positive value.

In operation S216, the segment reader 42 reads a segment from the UC queue 22.

In operation S218, when the MC queue 24 is not empty ("No" in operation S212), the queue switch controller 44 determines whether the next segment is a segment included in a new packet. In the embodiment, it is assumed that a segment header of a segment contains data capable of indicating a type of the segment. The types of a segment includes, for example, a beginning segment of a packet, an ending segment of a packet, an intermediate segment of a packet, a segment included in a packet consisting of a single segment, or the like. The queue switch controller 44 records a type of a segment which was read during a previous segment read process. Thus, it may be determined that the next segment is a segment included in a new packet when a segment which was read during a previous segment read process is an ending segment of a packet or a segment included in a packet consisting of a single segment.

In operation S220, when the next segment is a segment included in a new packet ("Yes" in operation S218), the segment read unit 28 performs a "new reading" process. The details of the "new reading" process will be discussed later.

In operation S222, when the next segment is not a segment included in a new packet ("No" in operation S218), the segment read unit 28 performs a "continued reading" process. The details of the "continued reading" process will be discussed later.

Figure 6:
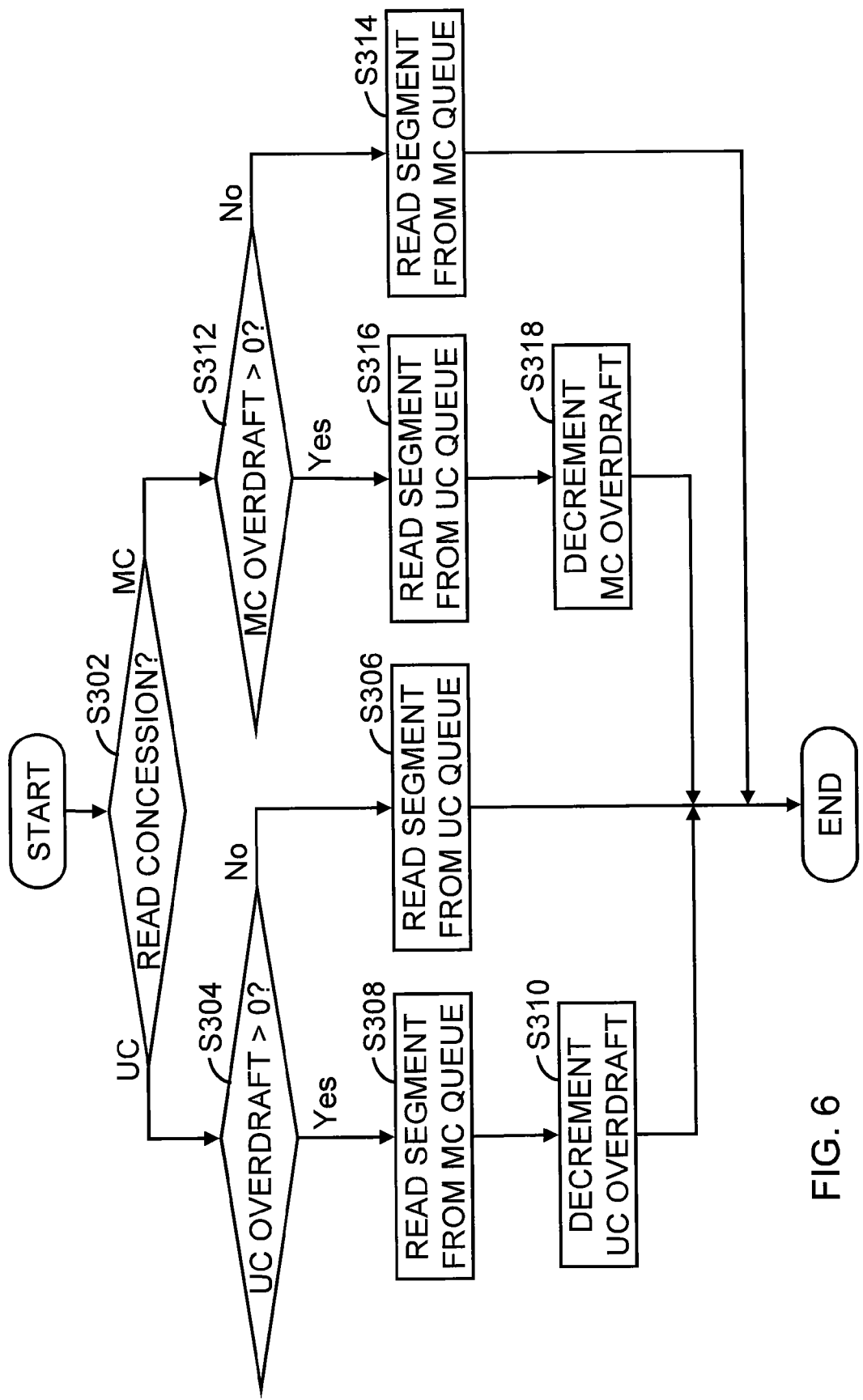
FIG. 6 is a flowchart illustrating an example of an operation flow of a "new reading" process according to an embodiment of the present invention.

FIG. 6 is a flowchart illustrating an example of an operation flow of a "new reading" process according to an embodiment of the present invention. Hereinafter, an operation flow of the "new reading" process according to the embodiment will be discussed in the order of operation S302 to operation S318 illustrated in FIG. 6.

In operation S302, the read concession assignor 48 determines which of the UC queue 22 and the MC queue 24 is assigned with the read concession.

In operation S304, when the UC queue 22 is assigned with the read concession ("UC" in operation S302), the read adequacy determiner 54 determines whether the value of the UC overdraft amount is a positive value.

In operation S306, when the value of the UC overdraft amount is not a positive value ("No" in operation S304), the segment reader 42 reads a segment from the UC queue 22.

In operation S308, when the value of the UC overdraft amount is a positive value ("Yes" in operation S304), the segment reader 42 reads a segment from the MC queue 24.

In operation S310, the overdraft updater 52 subtracts one from the value of the UC overdraft amount.

In operation S312, when the MC queue 24 is assigned with the read concession ("MC" in operation S302), the read adequacy determiner 54 determines whether the value of the MC overdraft amount is a positive value.

In operation S314, when the value of the MC overdraft amount is not a positive value ("No" in operation S312), the segment reader 42 reads a segment from the MC queue 24.

In operation S316, when the value of the MC overdraft amount is a positive value ("Yes" in operation S312), the segment reader 42 reads a segment from the UC queue 22.

In operation S318, the overdraft updater 52 subtracts one from the value of the MC overdraft amount.

As discussed above, when the value of an overdraft amount corresponding to one queue assigned with the read concession is a positive value, the segment read process is performed on the other queue.

Figure 7:
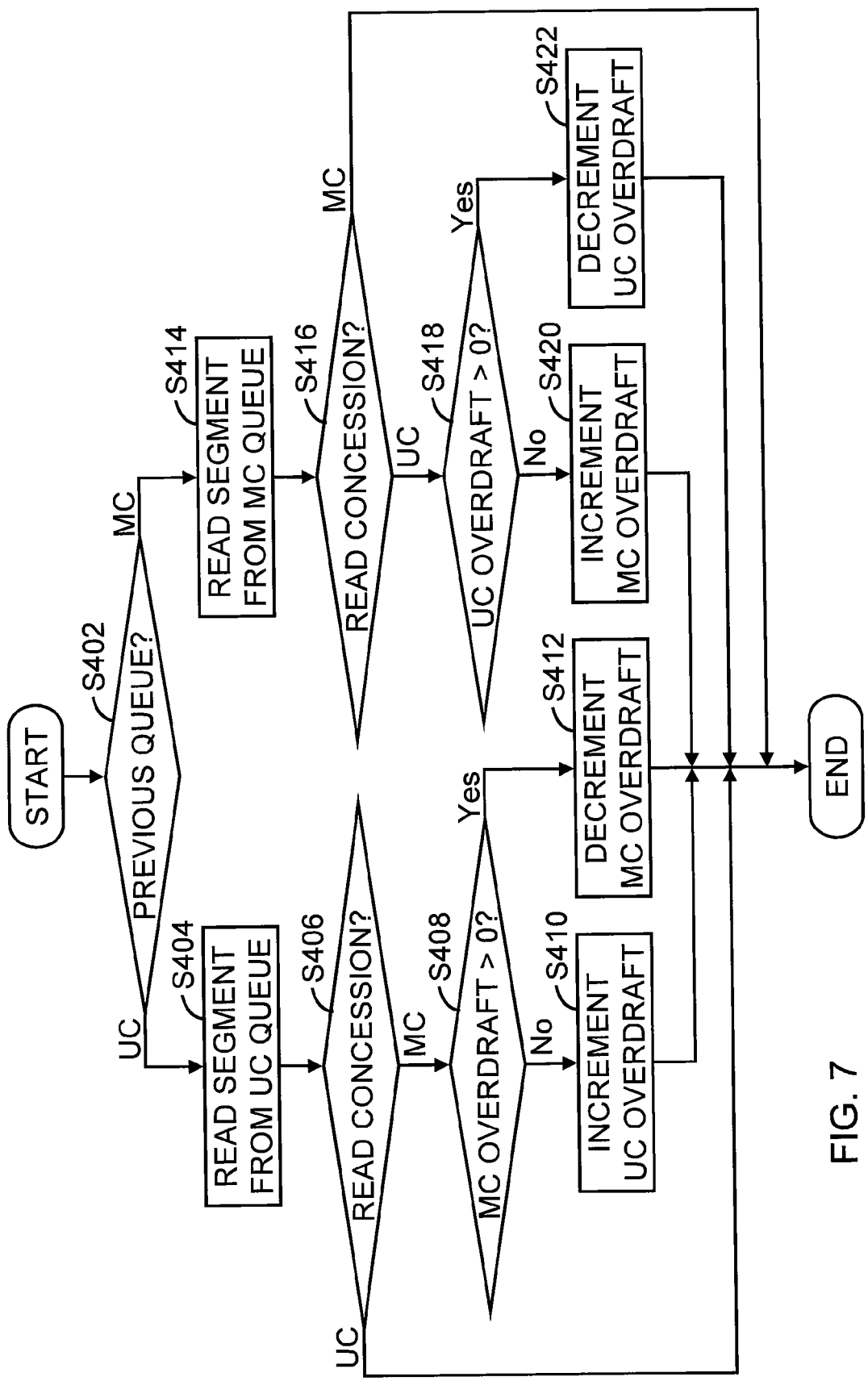
FIG. 7 is a flowchart illustrating an example of an operation flow of a "continued reading" process according to an embodiment of the present invention.

FIG. 7 is a flowchart illustrating an example of an operation flow of a "continued reading" process according to an embodiment of the present invention. Hereinafter, an operation flow of the "continued reading" process according to the embodiment will be discussed in the order of operation S402 to operation S422 illustrated in FIG. 7.

In operation S402, the queue switch controller 44 determines on which of the UC queue 22 and the MC queue the previous segment read process was performed. In the embodiment, it is assumed that, on which of the UC queue 22 and the MC queue 24 the previous segment read process was performed is recorded by setting or resetting a queue flag which is capable of indicating a queue on which the previous segment read process was performed.

In operation S404, when the previous segment read process was performed on the UC queue 22 ("UC" in operation S402), the segment reader 42 reads a segment from the UC queue 22.

In operation S406, the queue switch controller 44 determines which of the UC queue 22 and the MC queue 24 has the read concession.

In operation S408, when the MC queue 24 has the read concession ("MC" in operation S406), the queue switch controller 44 determines whether the value of the MC overdraft amount is a positive value.

In operation S410, when the value of the MC overdraft amount is not a positive value ("No" in operation S408), the overdraft updater 52 adds one to the value of the UC overdraft amount.

In operation S412, when the value of the MC overdraft amount is a positive value ("Yes" in operation S408), the overdraft updater 52 subtracts one from the value of the MC overdraft amount.

In operation S414, when the previous segment read process was performed on the MC queue 24 ("MC" in operation S402), the segment reader 42 reads a segment from the MC queue 24.

In operation S416, the queue switch controller 44 determines which of the UC queue 22 and the MC queue 24 has the read concession.

In operation S418, when the UC queue 22 has the read concession ("UC" in operation S416), the queue switch controller 44 determines whether the value of the UC overdraft amount is a positive value.

In operation S420, when the value of the UC overdraft amount is not a positive value ("No" in operation S418), the overdraft updater 52 adds one to the value of the MC overdraft amount.

In operation S422, when the value of the UC overdraft amount is a positive value ("Yes" in operation S418), the overdraft updater 52 subtracts one from the value of the UC overdraft amount.

By providing such a configuration as discussed above, the packet relay device according to the embodiment may reflect, in the queue scheduling, a weight allocated to each queue to time allocation of the segment read process performed on the corresponding queue.

Hereinafter a more specific example will be discussed.

Figure 8:
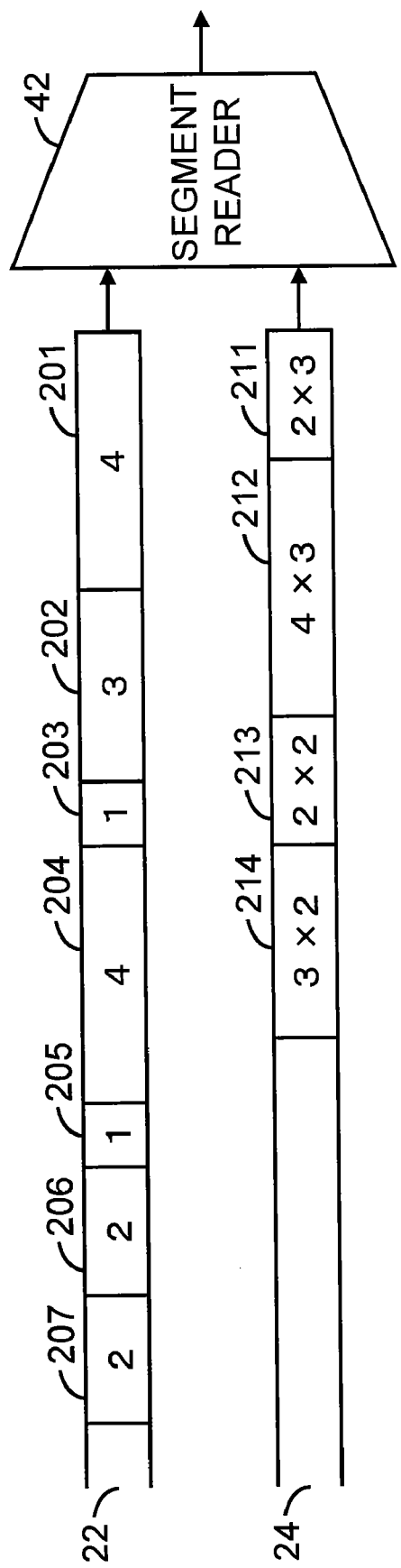
FIG. 8 is a diagram illustrating an example of queues according to an embodiment of the present invention.

FIG. 8 is a diagram illustrating an example of queues according to an embodiment of the present invention. FIG. 8 illustrates the UC queue 22 and the MC queue 24. In the UC queue 22, unicast packets 201 to 207 are stored. The number of segments constituting each unicast packet is illustrated in each box representing a unicast packet, respectively. In the MC queue 24, multicast packets 211 to 214 are stored. The number of segments constituting each multicast packet M and the number of output ports N are illustrated in the form of M×N in each box representing a multicast packet, respectively.

Figure 9:
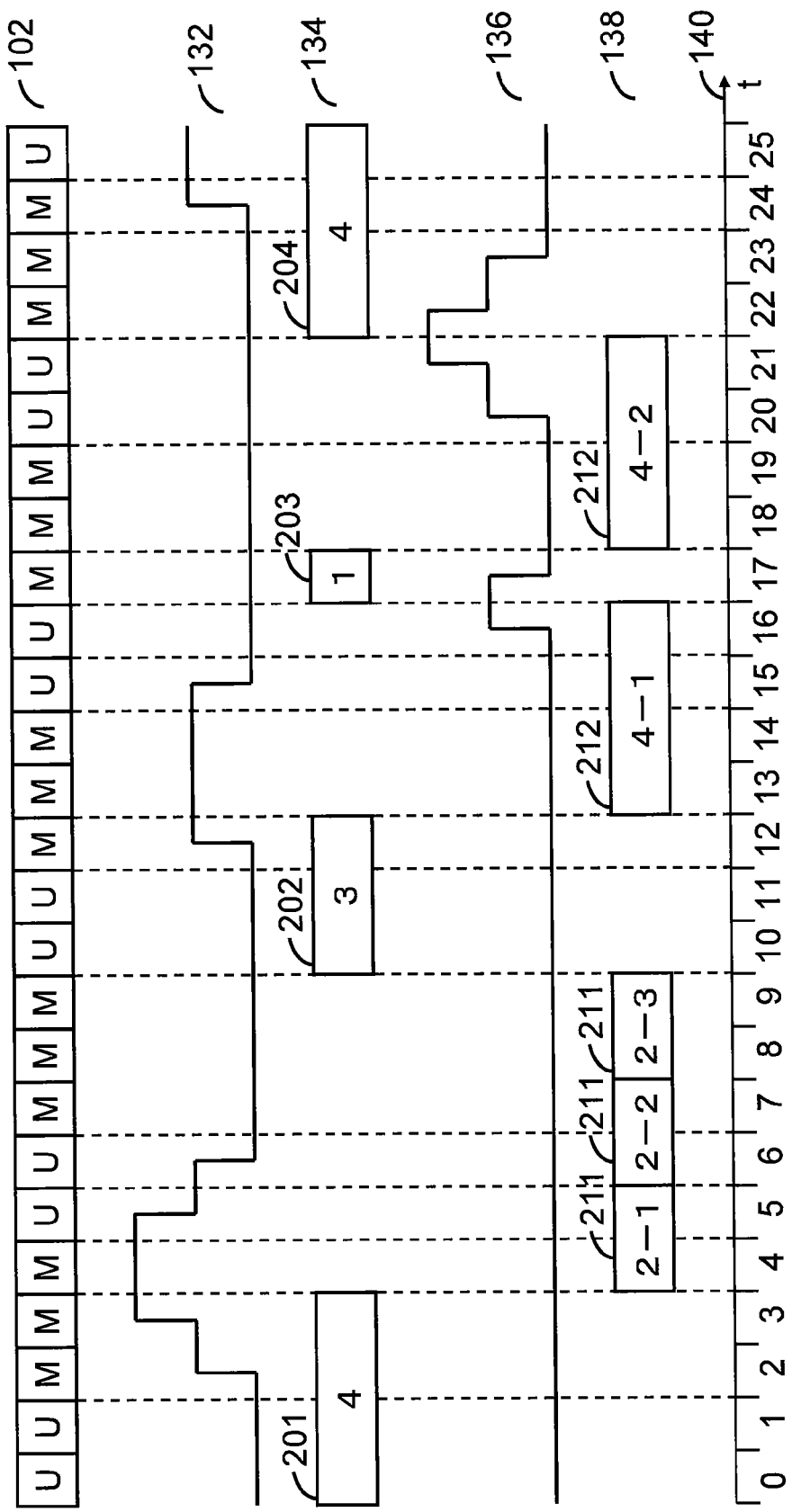
FIG. 9 is a diagram illustrating an example of a queue scheduling according to an embodiment of the present invention.

FIG. 9 is a diagram illustrating an example of a queue scheduling according to an embodiment of the present invention. FIG. 9 illustrates the read concession indication 102, a UCC graph 132, a sequence of unicast packets 134, an MCC graph 136, a sequence of multicast packets 138, and a time axis 140.

The UCC graph 132 represents a time variation of a value of the UC overdraft amount.

The sequence of unicast packets 134 represents time periods when each unicast packet is read from the UC queue 22.

The MCC graph 136 represents a time variation of a value of the MC overdraft amount.

The sequence of multicast packets 138 represents time periods when each multicast packet is read from the MC queue 24.

For the sake of convenience in discussion, a time period number is appended, along the time axis 140, to each time period while a segment is read. In this example illustrated in FIG. 9, it is assumed that weights are allocated in accordance with the following expression, UC:MC=2:3. According to the read concession indication 102, it may be understood that, during time periods 0 and 1, the read concession is assigned to the UC queue 22, and during time periods 2 to 4, the read concession is assigned to the MC queue 24.

A time period 0 is a "new reading" time period. It is assumed that the value of the UC overdraft amount and the value of the MC overdraft amount are 0, respectively, during the time period 0.

During the time period 0, the read concession is assigned to the UC queue 22, and the value of the UC overdraft amount is not a positive value. Thus, the segment read unit 28 reads a packet from the UC queue 22. The unicast packet 201 stored at the head of the UC queue 22 is a packet consisting of four segments. Thus, the segment read unit 28 reads segments from the UC queue 22 across four time periods (time periods 0 to 3). During the first two time periods (time periods 0 and 1), the read concession is assigned to the UC queue 22, thus, causing no change in values of the UC overdraft amount and the MC overdraft amount. During the following two time periods (time periods 2 and 3), the MC queue 24 has the read concession, thus, the UC overdraft amount is added by one during each of the two time periods. After the unicast packet 201 has been read, the unicast packet 202 becomes a head packet in the UC queue 22.

During a time period 4, the read concession is assigned to the MC queue 24, and the value of the MC overdraft amount is not a positive value. Thus, the segment read unit 28 reads a packet from the MC queue 24. This segment read process is performed with respect to a first copy out of three copies of the multicast packet 211 stored at the head of the MC queue 24. The multicast packet 211 is a packet consisting of two segments, thus, the segment read unit 28 reads segments from the MC queue 24 across two time periods (time periods 4 and 5). During the first time period (time period 4), the MC queue 24 has the read concession, thus, causing no change in the values of the UC overdraft amount and the MC overdraft amount. During the following one time period (time period 5), the UC queue 22 has the read concession, and the value of the UC overdraft amount is a positive value. Thus, the value of the UC overdraft amount is subtracted by one.

During a time period 6, the read concession is assigned to the UC queue 22, and the value of the UC overdraft amount is a positive value. Thus, the segment read unit 28 reads a packet from the MC queue 24. This segment read process is performed with respect to a second copy out of the three copies of the multicast packet 211 stored at the head of the MC queue 24. The multicast packet 211 is a packet consisting of two segments, thus, the segment read unit 28 reads segments from the MC queue 24 across two time periods (time periods 6 and 7). During the first time period (time period 6), the value of the UC overdraft amount is subtracted by one. During the following one time period (time period 7), the MC queue 24 has the read concession, and thus, causing no change in the values of the UC overdraft amount and the MC overdraft amount.

During a time period 8, the read concession is assigned to the MC queue 24, and the value of the MC overdraft amount is not a positive value. Thus, the segment read unit 28 reads a packet from the MC queue 24. This segment read process is performed with respect to a third copy out of the three copies of the multicast packet 211 stored at the head of the MC queue 24. The multicast packet 211 is a packet consisting of two segments, thus, the segment read unit 28 reads segments from the MC queue 24 across two time periods (time periods 8 and 9). During this two time periods (time periods 8 and 9), the MC queue 24 has the read concession, thus, causing no change in the values of the UC overdraft amount and the MC overdraft amount. After the multicast packet 211 has been read, the multicast packet 212 becomes a head packet in the MC queue 24.

During a time period 10, the read concession is assigned to the UC queue 22, and the value of the UC overdraft amount is not a positive value. Thus, the segment read unit 28 reads a packet from the UC queue 22. The unicast packet 202 stored at the head of the uc queue 22 is a packet consisting of three segments, thus, the segment read unit 28 reads segments from the UC queue 22 across three time periods (time periods 10 to 12). During the first two time periods (time periods 10 and 11), the read concession is assigned to the UC queue 22, thus, causing no change in the values of the UC overdraft amount and the MC overdraft amount. During the following one time period (time period 12), the read concession is assigned to the MC queue 24, and the value of the MC overdraft amount is not a positive value. Thus, the value of the UC overdraft amount is added by one. After the unicast packet 202 has been read, the unicast packet 203 becomes a head packet in the UC queue 22.

During a time period 13, the read concession is assigned to the MC queue 24, and the value of the MC overdraft amount is not a positive value. Thus, the segment read unit 28 reads a packet from the MC queue 24. This segment read process is performed with respect to a first copy out of three copies of a multicast packet 212 stored at the head of the MC queue 24. The multicast packet 212 is a packet consisting of four segments, thus, the segment read unit 28 reads segments from the MC queue 24 across four time periods (time periods 13 to 16). During the first two time periods (time periods 13 and 14), the MC queue 24 has the read concession, thus, causing no change in the values of the UC overdraft amount and the MC overdraft amount. During the following one time period (time period 15), the read concession is assigned to the UC queue 22, and the value of the UC overdraft amount is a positive value. Thus, the value of the UC overdraft amount is subtracted by one. During the following one time period (time period 16), the UC queue 22 has the read concession, and the value of the UC overdraft amount is not a positive value. Thus, the value of the MC overdraft amount is added by one.

During a time period 17, the read concession is assigned to the MC queue 24, and the value of the MC overdraft amount is a positive value. Thus, the segment read unit 28 read a packet from the UC queue 22. The unicast packet 203 stored at the head of the UC queue 22 is a packet consisting of only one segment, thus, the segment read unit 28 reads a segment from the UC queue 22 during only one time period (time period 17). During this time period (time period 17), the value of the MC overdraft amount is subtracted by only one. After the unicast packet 203 has been read, the unicast packet 204 becomes a head packet in the UC queue 22.

During a time period 18, the read concession is assigned to the MC queue 24, and the value of the MC overdraft amount is not a positive value. Thus, the segment read unit 28 reads a packet from the MC queue 24. This segment read process is performed with respect to a second copy out of the three copies of the multicast packet 212 stored at the head of the MC queue 24. The multicast packet 212 is a packet consisting of four segments, thus, the segment read unit 28 reads segments from the MC queue 24 across four time periods (time periods 18 to 21). During the first two time periods (time periods 18 and 19), the MC queue 24 has the read concession, thus, causing no change in the values of the UC overdraft amount and the MC overdraft amount. During the following two time periods (time periods 20 and 21), the read concession is assigned to the UC queue 22, and the value of the UC overdraft amount is not a positive value. Thus, the value of the MC overdraft amount is added by one during each of the two time periods.

During a time period 22, the read concession is assigned to the MC queue 24, and the value of the MC overdraft amount is a positive value. Thus, the segment read unit 28 reads a packet from the UC queue 22. The unicast packet 204 stored at the head of the UC queue 22 is a packet consisting of four segments, thus, the segment read unit 28 reads segments from the UC queue 22 across four time periods (time periods 22 to 25). During the first two time periods (time periods 22 and 23), the read concession is assigned to the MC queue 24, and the value of the MC overdraft amount is a positive value, thus, the value of the MC overdraft amount being subtracted by one during each of the two time periods. During the following one time period (time period 24), the read concession is assigned to the MC queue 24, and the value of the MC overdraft amount is not a positive value. Thus, the value of the UC overdraft amount is added by one. During the following one time period (time period 25), the UC queue 22 has the read concession, and thus, causing no change in the values of the UC overdraft amount and the MC overdraft amount. After the unicast packet 204 has been read, the unicast packet 205 becomes a head packet in the UC queue 22.

In the embodiment discussed above, it is assumed that the packet relay device includes only two queues, i.e., the UC queue and the MC queue. However, it is not limited to this, but the packet relay device may include three queues or more. In such a case, the values of the overdraft amounts corresponding to a queue on which the segment read process is performed and a different queue which has the read concession may be increased or decreased during the same time period while the segment read process is performed.

In the embodiment discussed above, it is assumed that each queue corresponds to an overdraft amount. However, when the packet relay device includes only two queues, only one overdraft amount may be provided. In such a case, a positive sign and a negative sign thereof may identify two overdraft amounts corresponding to the two queues, respectively.

As discussed above, according to the embodiment, it may be possible to provide a queue scheduling method which may not require to increase the size of the queues even when the weights allocated to individual queues are increased in the queue scheduling in the packet relay device.

Functions included in the packet relay device 1 according to the above-discussed embodiment of the present invention may be realized not only in the form of hardware, but also in the form of software executed by a computer incorporated in the packet relay device 1. For example, by developing a program which allows a computer to execute functions of the segment reader 42, the queue switch controller 44, the read concession assignor 48, the overdraft updater 52 and the read adequacy determiner 54, and allowing the program to be written into memory devices of the computer and be executed by the computer, it is possible to realize the functions of the segment read unit 28.

Such a program that enables realization of the packet relay device 1 according to the embodiment of the present invention may be stored in memory devices, such as ROM devices or RAM devices, both being incorporated in the packet relay device 1, or recording media, such as a hard disc, and when executing the program, the program is loaded to a main memory, and is executed thereon.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet relay device for relaying a packet, the packet relay device comprising:
   a plurality of queues each for storing packet data of a received packet;
   a read concession assignor for assigning one of the plurality of queues with a read concession for a predefined time period, the read concession allowing the packet relay device to read packet data stored in a queue assigned with the read concession;
   an overdraft storage for storing an overdraft amount in connection with each of the plurality of queues, the overdraft amount indicating an amount of packet data read from a queue during a time period while another queue is assigned with the read concession;
   a read adequacy determiner for determining, in accordance with an overdraft amount stored in connection with one queue out of the plurality of queues, whether to read packet data from the one queue; and
   an overdraft updater for updating at least one of a first overdraft amount stored in connection with a first queue and a second overdraft amount stored in connection with a second queue different from the first queue upon reading packet data from the first queue during a time period while the second queue is assigned with the read concession.

2. The packet relay device of claim 1, wherein
   the read concession assignor assigns one of the plurality of queues with the read concession in accordance with weights predefined for each of the plurality of queues.

3. The packet relay device of claim 1, wherein
   the read concession assignor assigns, when more than one queue out of the plurality of queues is nonempty, one of the more than one queue with the read concession for the predefined time period in accordance with weights predefined for each of the more than one queue.

4. The packet relay device of claim 1, wherein
   the read adequacy determiner determines to read packet data from the one queue when the overdraft amount stored in connection with the one queue is nonpositive.

5. The packet relay device of claim 1, wherein
   the overdraft updater
      adds to the first overdraft amount an amount of packet data read from the first queue during the time period while the second queue is assigned with the read concession, and
      subtracts from the second overdraft amount the amount of packet data read from the first queue.

6. The packet relay device of claim 1, wherein
   the plurality of queues consists of a primary queue and a secondary queue,
   the overdraft storage stores one overdraft amount,
   the read adequacy determiner determines to read packet data from the secondary queue when the one overdraft amount is nonnegative, and
   the overdraft updater
      adds to the one overdraft amount an amount of packet data read from the primary queue during a time period while the secondary queue is assigned with the read concession, and
      subtracts from the one overdraft amount an amount of packet data read from the secondary queue during a time period while the primary queue is assigned with the read concession.

7. The packet relay device of claim 1, wherein
   the plurality of queues consists of a primary queue and a secondary queue, and
   the overdraft updater
      adds to a primary overdraft amount stored in connection with the primary queue an amount of packet data read from the primary queue during a time period while the secondary queue is assigned with the read concession when a secondary overdraft amount stored in connection with the secondary queue is nonpositive, and
      subtracts from the secondary overdraft amount the amount of packet data read from the primary queue when the secondary overdraft amount is positive.

8. A queue scheduling method executed by a packet relay device for relaying a packet, the packet relay device including a plurality of queues each for storing packet data of a received packet, the queue scheduling method comprising:
   assigning one of the plurality of queues with a read concession for a predefined time period, the read concession allowing the packet relay device to read packet data stored in a queue assigned with the read concession;
   storing an overdraft amount in connection with each of the plurality of queues, the overdraft amount indicating an amount of packet data read from a queue during a time period while another queue is assigned with the read concession;
   determining, in accordance with an overdraft amount stored in connection with one queue out of the plurality of queues, whether to read packet data from the one queue; and
   updating at least one of a first overdraft amount stored in connection with a first queue and a second overdraft amount stored in connection with a second queue different from the first queue upon reading packet data from the first queue during a time period while the second queue is assigned with the read concession.

9. The queue scheduling method of claim 8, wherein
in the assigning one of the plurality of queues with the read concession,
the one of the plurality of queues is assigned with the read concession in accordance with weights predefined for each of the plurality of queues.

10. The queue scheduling method of claim 8, wherein
in the assigning one of the plurality of queues with the read concession,
when more than one queue out of the plurality of queues is nonempty, the one of the more than one queue is assigned with the read concession for the predefined time period in accordance with weights predefined for each of the more than one queue.

11. The queue scheduling method of claim 8, wherein
in the determining whether to read packet data from the one queue,
it is determined to read packet data from the one queue when the overdraft amount stored in connection with the one queue is nonpositive.

12. The queue scheduling method of claim 8, wherein
in the updating at least one of the first overdraft amount and the second overdraft amount,
an amount of packet data read from the first queue during the time period while the second queue is assigned with the read concession is added to the first overdraft amount, and
the amount of packet data read from the first queue is subtracted from the second overdraft amount.

13. The queue scheduling method of claim 8, wherein
the plurality of queues consists of a primary queue and a secondary queue,
one overdraft amount is stored in the storing the overdraft amount,
it is determined to read packet data from the secondary queue when the one overdraft amount is nonnegative in the determining whether to read packet data from the one queue, and
in the updating at least one of the first overdraft amount and the second overdraft amount,
an amount of packet data read from the primary queue during a time period while the secondary queue is assigned with the read concession is added to the one overdraft amount, and
an amount of packet data read from the secondary queue during a time period while the primary queue is assigned with the read concession is subtracted from the one overdraft amount.

14. The queue scheduling method of claim 8, wherein
the plurality of queues consists of a primary queue and a secondary queue, and
in the updating at least one of the first overdraft amount and the second overdraft amount,
an amount of packet data read from the primary queue during a time period while the secondary queue is assigned with the read concession is added to a primary overdraft amount stored in connection with the primary queue when a secondary overdraft amount stored in connection with the secondary queue is nonpositive, and
the amount of packet data read from the primary queue is subtracted from the secondary overdraft amount when the secondary overdraft amount is positive.

15. A non-transitory computer-readable medium storing a program that causes a computer to execute a queue scheduling method, the computer serving as a packet relay device for relaying a packet, the computer including a plurality of queues each for storing packet data of a received packet, the queue scheduling method including:
assigning one of the plurality of queues with a read concession for a predefined time period, the read concession allowing the packet relay device to read packet data stored in a queue assigned with the read concession,
storing an overdraft amount in connection with each of the plurality of queues, the overdraft amount indicating an amount of packet data read from a queue during a time period while another queue is assigned with the read concession,
determining, in accordance with an overdraft amount stored in connection with one queue out of the plurality of queues, whether to read packet data from the one queue, and
updating at least one of a first overdraft amount stored in connection with a first queue and a second overdraft amount stored in connection with a second queue different from the first queue upon reading packet data from the first queue during a time period while the second queue is assigned with the read concession.

16. The non-transitory computer-readable medium of claim 15, wherein
in the assigning one of the plurality of queues with the read concession,
the one of the plurality of queues is assigned with the read concession in accordance with weights predefined for each of the plurality of queues.

17. The non-transitory computer-readable medium of claim 15, wherein
in the assigning one of the plurality of queues with the read concession,
when more than one queue out of the plurality of queues is nonempty, the one of the more than one queue is assigned with the read concession for the predefined time period in accordance with weights predefined for each of the more than one queue.

18. The non-transitory computer-readable medium of claim 15, wherein
in the determining whether to read packet data from the one queue,
it is determined to read packet data from the one queue when the overdraft amount stored in connection with the one queue is nonpositive.

19. The non-transitory computer-readable medium of claim 15, wherein
in the updating at least one of a first overdraft amount and a second overdraft amount,
an amount of packet data read from the first queue during the time period while the second queue is assigned with the read concession is added to the first overdraft amount, and
the amount of packet data read from the first queue is subtracted from the second overdraft amount.

20. The non-transitory computer-readable medium of claim 15, wherein
the plurality of queues consists of a primary queue and a secondary queue,
one overdraft amount is stored in the storing the overdraft amount,
it is determined to read packet data from the secondary queue when the one overdraft amount is nonnegative in the determining whether to read packet data from the one queue, and
in the updating at least one of a first overdraft amount and a second overdraft amount, an amount of packet data read from the primary queue during a time period while the secondary queue is assigned with the read concession is added to the one overdraft amount, and an amount of packet data read from the secondary queue during a time period while the primary queue is assigned with the read concession is subtracted from the one overdraft amount.

* * * * *